Feb. 28, 1939.  L. W. BLAU  2,148,422
METHOD OF DETERMINING THE DIPS OF GEOLOGICAL STRATA
WITH SUBSTANTIALLY VERTICAL REFLECTIONS
Filed June 26, 1936  4 Sheets-Sheet 1

Ludwig W. Blau Inventor
By W. F. Weigester Attorney

Fig. — 2

Patented Feb. 28, 1939

2,148,422

UNITED STATES PATENT OFFICE 2,148,422

METHOD OF DETERMINING THE DIPS OF GEOLOGICAL STRATA WITH SUBSTANTIALLY VERTICAL REFLECTIONS

Ludwig W. Blau, Houston, Tex., assignor to Standard Oil Development Company, a corporation of Delaware Application June 26, 1936, Serial No. 87,461

6 Claims. (Cl. 181—0.5)

This invention relates to an improvement in the method of determining the dip of subsurface earth strata.

In seismic geophysical prospecting by means of reflections, the accurate determination of the dips of the reflecting layers is of paramount importance. The determination of these dips is made very difficult by the presence of the so-called low velocity layer, in which seismic velocities are abnormally low, often-times lower than the speed of sound in air; the depth of this low velocity layer varies greatly from point to point. Also, its lower boundary cannot be determined in any other way, or by any other method, than by shooting, because there are no visible changes in color or grain size, and apparently no definite changes in the chemical constitution. The boundary seems to be an acoustic one; in other words, the ratio of elasticity to the density is much smaller in the low velocity layer than in the layer lying under it. Due to the variation in depth of the low velocity layer from one detector, or receiver, position to the next, reflected waves require different times to traverse the low velocity layer, so that the reflection times are affected by the depth of the low velocity layer and the velocity of seismic waves therein to an unknown amount, unless special pains are taken to determine these unknown quantities. This requires additional shots and with the customary detector arrangement in which the detectors are set on a line through the shot-point and oftentimes at great distances from the latter, it requires several shots to obtain reflection times in more than one direction from the shot-point. Now it is rarely possible to load consecutive shots at the same depth, so that the reflection times obtained are different from different shots. This difference is easily determined if the waves from several shots are recorded without moving the receivers. However, in order to obtain records in different directions from the shot-point, it is necessary to move the receivers, and it is obvious that it now becomes impossible to determine whether or not the charges were exploded at the same depth.

It is an object of this invention to provide an arrangement whereby it is possible to obtain reflection records from receivers located on two or more lines running in different directions from the shot-point with a single shot. Thus, it becomes possible to determine the dip of the reflecting layer more accurately than by the methods now used, because the errors introduced by using more than one shot are eliminated and the low velocity layer correction can be more accurately made and applied to the reflection times.

Other objects will be apparent from the specification and from the accompanying drawing, in which latter—

Figure 1:
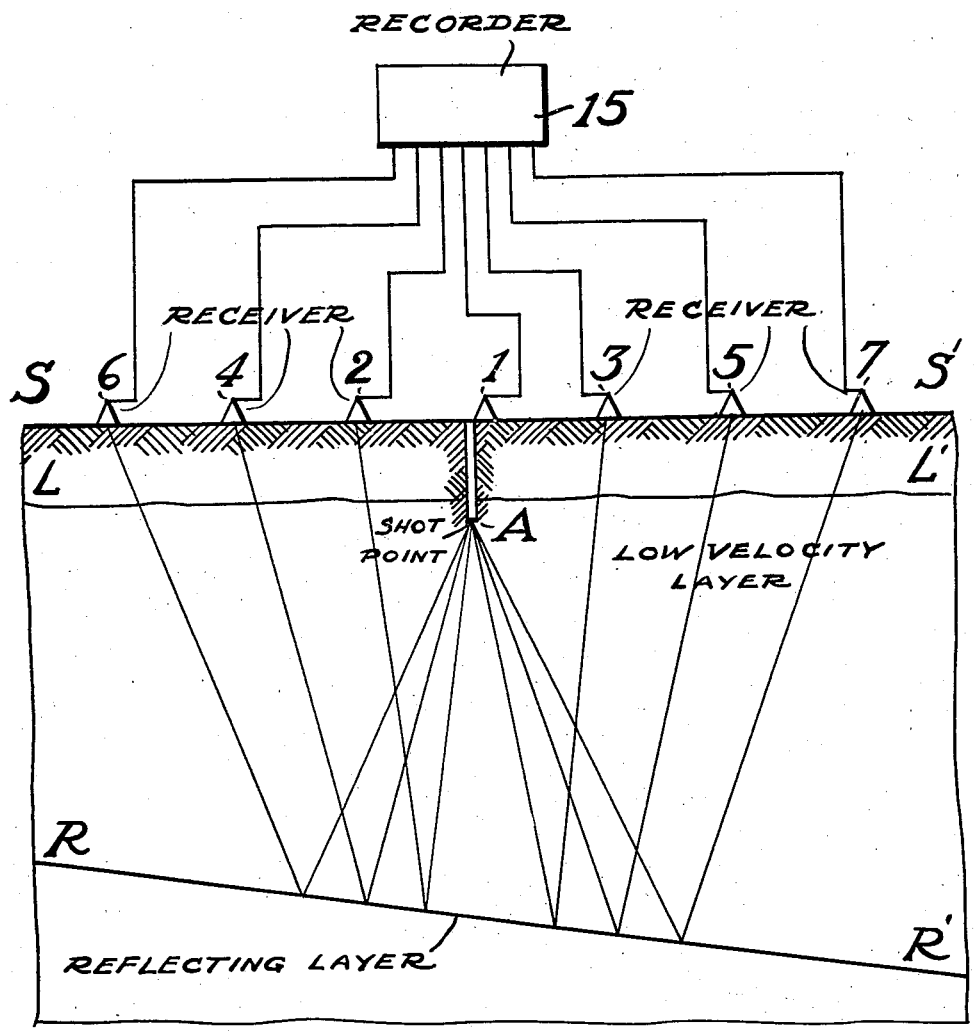
Fig. 1 is a vertical sectional view through the earth showing a preferred arrangement of apparatus for carrying out the invention.
Figure 2:
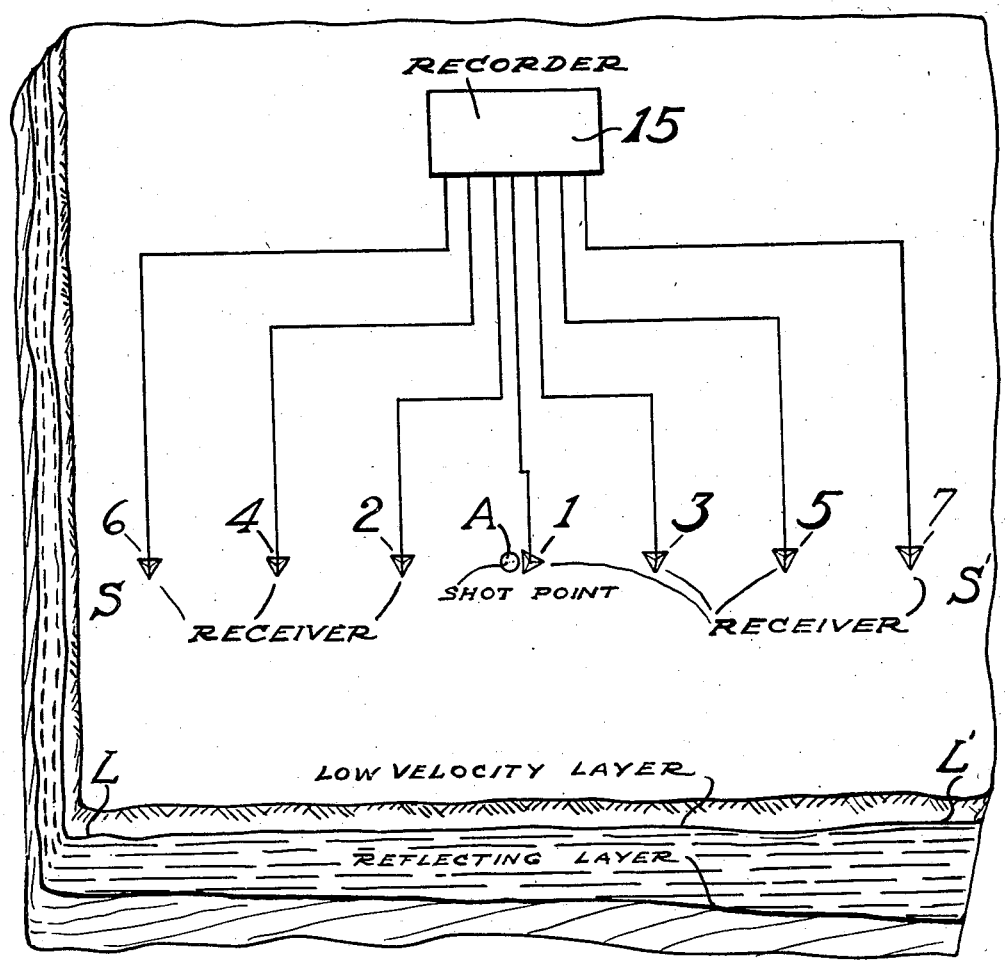
Fig. 2 is a top plan view showing the arrangement of shot-point and detectors illustrated in Fig. 1.

In Figs. 1 and 2, SS' is the surface of the ground, LL' the bottom of the low velocity layer and A the shot-point. Receivers 1, 2, 3, 4, 5, 6 and 7 are located at equal distances from each other, with receiver 1 at or near the shot-hole and the others divided into groups the individual elements of which are in alignment and extend in two directions from the shot-hole A. It is understood that the receiver at the shot-hole can be eliminated and the other receivers located at any convenient distance from the shot-hole greater than the distance between the individual receivers on any one direction from the shot-hole A. It is also understood that the groups of receivers can be increased in number and can be placed along more than two directions from the shot-hole A and that it is not necessary to have equal numbers of receivers in each group. The receivers are connected to a recorder 15 which in the case illustrated in Figs. 1 and 2 must be a seven-channel recorder. A shot is fired in the shot-hole A and the waves which arrive at the different receivers after refractions from shallow layers and after reflection from the reflecting layer RR' are recorded by means of recorder 15. It is evident that by means of this one shot reflection times are obtained on lines in two or more directions from the shot-point, so that the dip of the reflecting layer may be accurately determined.

Figure 3:
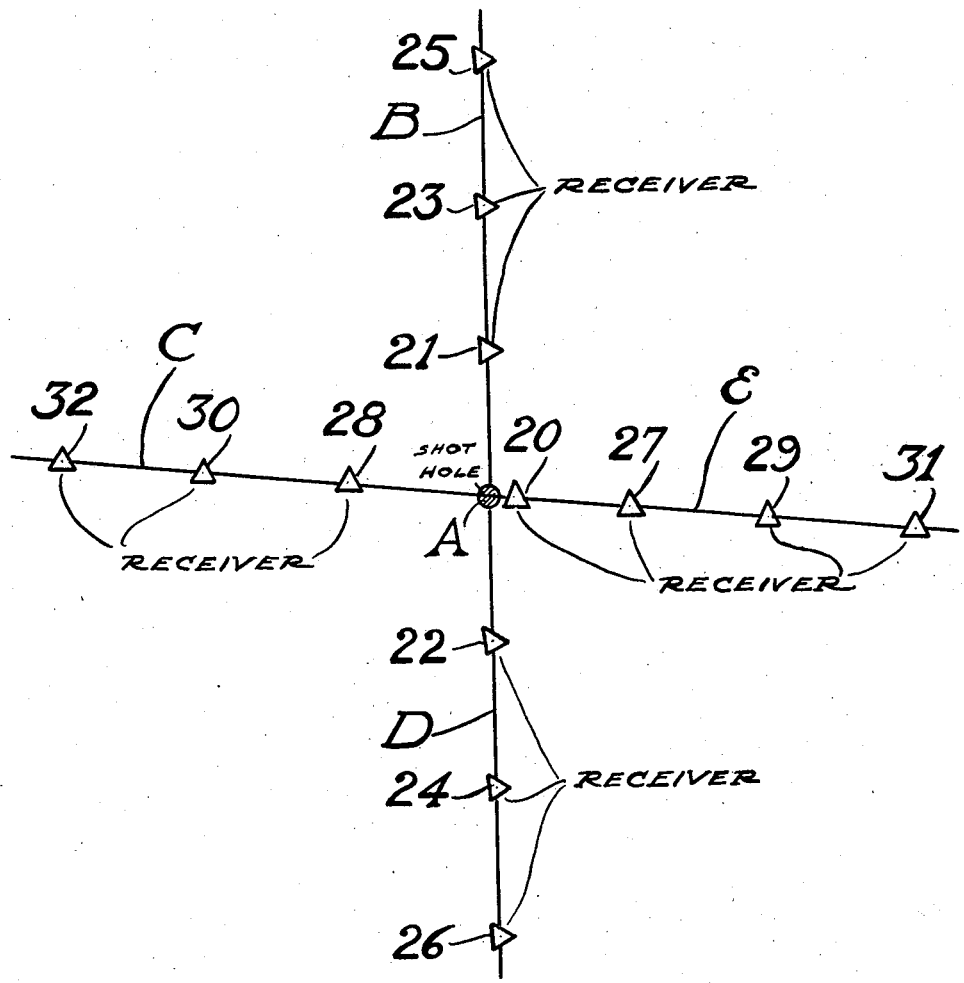
Fig. 3 is a top plan view showing an arrangement of the detectors with respect to the shot-point for carrying out the invention.

In Fig. 3 is shown an arrangement in which a receiver 20 is located near the shot-hole A, while other receivers 21 to 32 inclusive, are located on four lines B, C, D and E which extend through the shot-point. In the embodiment illustrated, three receivers are disposed in each of the four directions from the shot-hole. It is here again understood that although it is desirable to have the distances between the individual receivers on each line, or in each group, equal, the receivers 21, 22, 27 and 28 may be located at a greater distance from the shot-hole A. Also, it is sometimes possible to do satisfactory work without using the receiver 20 near the shot-hole A. It is desirable to connect all of the receivers to a thirteen-channel recorder similar to that illustrated in Figs. 1 and 2 if the receiver 20 is located near the shot-hole, or a twelve-channel recorder if this receiver is eliminated. However, one can use a six or seven-channel recorder by connecting the receivers of any two groups or lines B, C, D and E, to the recorder and shooting successive shots. Thus, receivers 20 to 26 inclusive may be connected to a seven-channel recorder and a record obtained; then receivers 20 and 27 to 32 inclusive may be connected to the same recorder and another shot obtained. With this arrangement, however, errors due to shot depth differences are not eliminated, so that it is more desirable in using a six or seven-channel recorder to connect the receivers on one of the lines or groups of aligned recorders B, C, D and E, say 21, 23 and 25, to the recorder permanently and shoot three shots from the shot-hole A, one for each of the remaining three lines or groups of recorders. It is desirable that the adjoining groups of aligned recorders be at right-angles to each other, and that there be a 90° angle between all of the adjoining groups of recorders, as illustrated in Fig. 3, but this is not necessary. It is also desirable to have two of the groups of aligned recorders extend up and down dip of the reflecting layer and the other two groups of aligned recorders extend along the strike, or approximately so. Calculation shows that four groups of aligned recorders are sufficient for determining the dip of the reflecting layer, but more groups may be used, and it is sometimes possible to work with only two groups in cases where the direction of the dip of the reflecting layer is known approximately from geological information. When four groups are used the following equation may be used for the definite correlation of the reflections:

$$t_1{}^2 + t_2{}^2 = t_3{}^2 + t_4{}^2$$

in which $t_1$, $t_2$, $t_3$, $t_4$ are reflection times in four different directions, not necessarily at right-angles, at equal distances from the shot-hole A, and $t_1$ is from a line opposite the hole from $t_2$, and $t_3$ is obtained opposite the hole from $t_4$. Thus, if the reflection times obtained in the four different directions at points equi-distant from the shot-hole do not satisfy this relation, it is immediately apparent that a low velocity layer correction must be introduced into one or more of these reflection times.

Figure 4:
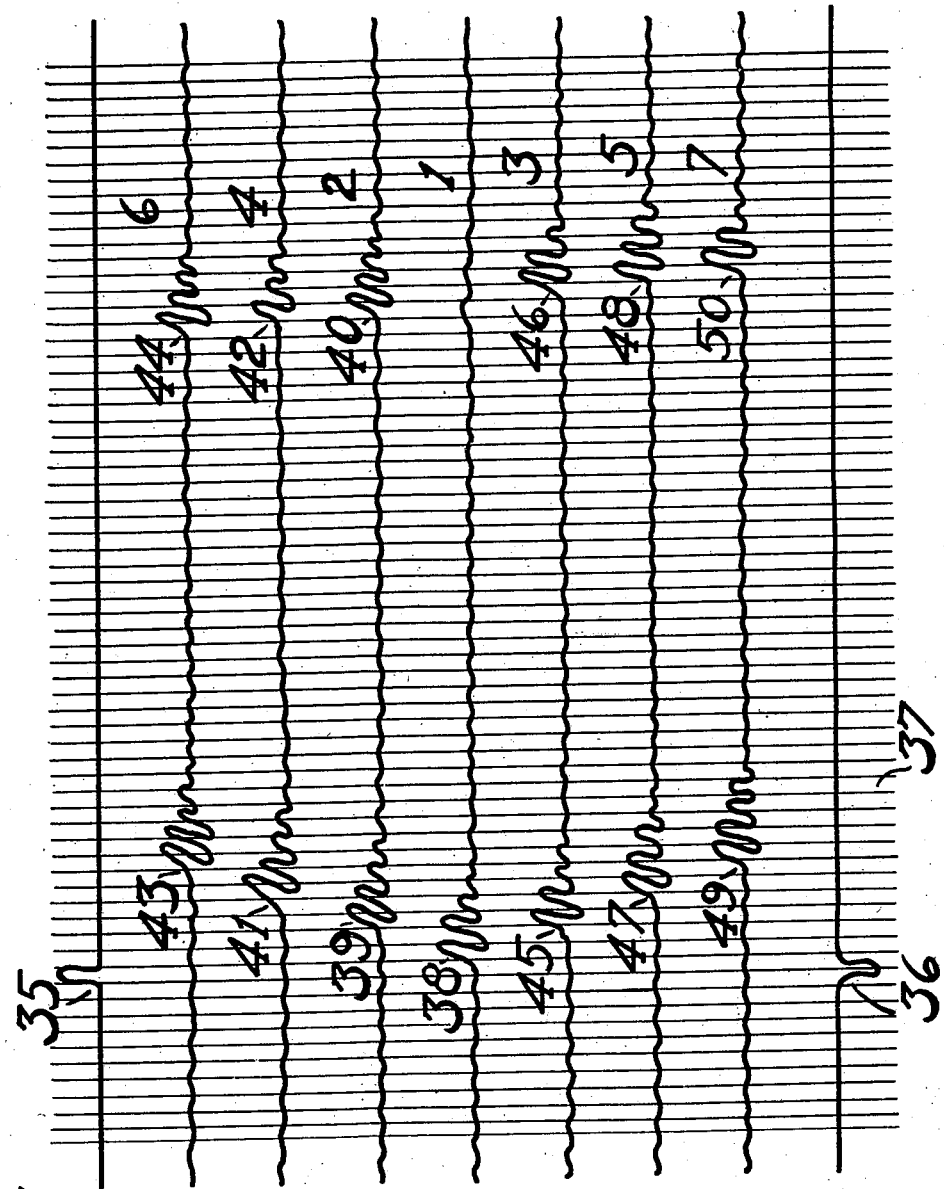
Fig. 4 is a record obtained from using the arrangement illustrated in Fig. 1.

Fig. 4 shows a record obtained with the arrangement of Figs. 1 and 2 on this record, numerals 35 and 36 designate the shot-instant; it is customary to record only one of these in cases where the time lines 37 extend across the whole record, as shown in Fig. 4. However, time marks are sometimes recorded in the form of dots regulated by a tuning fork, and with this arrangement it is desirable to have marks on both sides of the records so as to permit drawing of lines across the record at the points marking the arrival of the different waves. On this record, 38 marks the arrival of the direct wave from the shot at receiver 1; 39 marks the arrival of the direct wave at receiver 2, and 40 the arrival of the reflected wave at the same receiver. Likewise, 41 and 42 show the arrivals of the direct and reflected waves, respectively, at receiver 4; 43 and 44 at receiver 6; 45 and 46 at receiver 3; 47 and 48 at receiver 5, and 49 and 50 at receiver 7. It is noticed that the reflections arrive at receivers 3, 5 and 7 later than at receivers 2, 4 and 6. This, without any further calculation, shows conclusively that the reflecting layer dips down from receiver 6 toward receiver 7. If the low velocity layer is of uniform thickness and uniform seismic velocity across the whole profile, the direct wave on-sets, such as 38, 39, 41, 43, 45, 47 and 49, lie on straight lines, that is in alignment, across the record, if the traces are equidistant. Any deviation from straight lines on individual traces indicates a difference in the depth of the low velocity layer below the receiver which gave that certain trace. Also, if the low velocity layer is of the same thickness in both directions from the shot-point, the first wave arrivals at 38, 39, 41, 43, 45, 47 and 49 are symmetrical so that differences in the depths of the low velocity layer are also indicated by any lack of symmetry in the direct wave arrivals.

Various changes and alternate arrangements may be made within the scope of the appended claims, in which it is my intention to claim all novelty inherent in the art as broadly as the prior art permits.

I claim:

1. The method of determining the dip of a geological substratum which comprises generating seismic waves at a selected point, receiving reflections of said waves from the substratum under investigation at a plurality of points spaced from each other and arranged in alignment with each other, said receiving points being arranged in pairs with respect to said selected point with the receiving points of each pair being equidistantly spaced from the selected point and all of said receiving points being spaced from said selected point a distance less than the depth of the substratum under investigation, and recording simultaneously on a single record the reflected waves arriving at the receiving points.

2. The method for determining the dip of a geological substratum which comprises generating seismic waves at a selected point, receiving reflections of said waves from the substratum under investigation at a plurality of substantially equidistantly spaced points along the surface, some of said receiving points being arranged in substantial alignment with each other in one direction from said selected point and the remainder of said receiving points being arranged in alignment with each other in a different direction from said selected point and all of said receiving points being spaced from said selected point a distance less than the depth of the substratum under investigation, and recording the waves received at all of said receiving points.

3. The method of determining the dip of a geological substratum which comprises generating seismic waves at a selected point, receiving reflections of said waves from said substratum at a plurality of equidistantly spaced points along the surface in alignment with each other in a line passing through said selected point, said receiving points being symmetrically distributed with respect to said selected point and all of said receiving points being spaced from said selected point a distance less than the depth of the substratum under investigation, and recording on a single record the reflections arriving at all of said receiving points.

4. The method of determining the dip of a geological substratum which comprises generating seismic waves at a selected point, receiving reflections of said waves from said substratum at a plurality of points spaced from said selected point, certain of said receiving points being equidistantly spaced along a line passing through said selected point with some of said receiving points on each side of said selected point and the remainder of said receiving points being equidistantly spaced along a line intersecting said first line substantially at said selected point, some of said latter receiving points being on each side of said selected point, all of said receiving points being spaced from said selected point a distance less than the depth of the substratum under investigation, and recording on a single record the reflected waves arriving at all of said receiving points.

5. A method according to the preceding claim in which the lines of receiving points intersect each other at right angles at the selected point and the receiving points are arranged symmetrically with respect to said selected point.

6. The method of determining the dip of a geological substratum which comprises generating seismic waves at a selected point, receiving reflections of said waves from said substratum at a plurality of equidistantly spaced points arranged along the surface in a line passing through said selected point, the central one of said receiving points being coincident with the selected point and all of said receiving points being spaced from said selected point a distance less than the depth of the substratum under investigation and recording on a single record the reflections received at all of said receiving points.

LUDWIG W. BLAU.